United States Patent

[11] 3,557,380

| [72] | Inventor | David R. Matthews |
| | | Ann Arbor, Mich. |
| [21] | Appl. No. | 790,628 |
| [22] | Filed | Jan. 13, 1969 |
| [45] | Patented | Jan. 19, 1971 |
| [73] | Assignee | Laser Systems Corporation |
| | | Ann Arbor, Mich. |
| | | a corporation of Delaware |

[54] RADIATION SENSITIVE DISPLACEMENT MEASURING INSTRUMENT
22 Claims, 16 Drawing Figs.

[52] U.S. Cl. .................................................. 250/222,
250/219, 210/214
[51] Int. Cl. ...................................................... G01b 15/100
[50] Field of Search ....................................... 250/219th,
219, 214, 216, 231, 222, 221, 209; 356/156, 4,
172

[56] References Cited
UNITED STATES PATENTS

| 2,429,066 | 10/1947 | Kaehni | 250/219X |
| 3,263,087 | 7/1966 | Goldman et al. | 250/216X |
| 3,327,584 | 6/1967 | Kissinger | 356/156 |
| 3,395,287 | 7/1968 | Rajar | 250/234 |

Primary Examiner—Walter Stolwein
Attorney—Barnard, McGlynn & Reising

ABSTRACT: A displacement measuring instrument is disclosed which enables precise measurements without physical contact by using transmitted and reflected radiant energy, suitably in the infrared range. In one embodiment a transmitter emits a beam of radiant energy which irradiates a small area on the surface of the workpiece. A receiver has two detectors with respective fields of view disposed on opposite sides of the transmitter and directed in such a way that the receivers see the same part of the irradiated area on the workpiece when it is in a reference position. Thus, the receiver signals are equal even though the reflectance of the surface of the workpiece is nonuniform in space distribution. Displacement of the workpiece causes the receiver signals to change according to a predetermined function, and the signals are combined to develop a signal corresponding to displacement. In order to compensate for changes of reflectance which occur with time, means are provided to measure the reflectance. This is done by either a separate detector or by combining the receiver signals and compensation is achieved by automatic gain control in the receiver or by modifying the intensity of the transmitted beam.

INVENTOR.
David R. Matthews
BY
Barnard, McGlynn & Reising
ATTORNEYS

INVENTOR.
David R. Matthews

INVENTOR.
David R. Matthews
BY
Barnard, McGlynn & Reising
ATTORNEYS

RADIATION SENSITIVE DISPLACEMENT MEASURING INSTRUMENT

This invention relates to displacement measuring instruments and more particularly to such instruments for measuring displacements of an object or body through the medium of radiant energy transmitting and receiving means.

There are many instances of need for the precise measurement of the displacement or position of a body in such a manner that the measurement does not in any way disturb the body or require physical contact or engagement with it. Such a need often occurs in industrial operations, for example in the measurement of the dimension of a workpiece in a machining operation or in a rolling or extrusion operation. Such an instrument is desirable in connection with the set up of a machining operation so that a workpiece may be precisely located with reference to a machine tool. In analytical investigations, as in the case of vibration analysis, a noncontacting measuring instrument is most desirable. It is also desirable in testing operations such as the measurement of shaft roundness and indicating the angular position where correction is to be made. There are many applications in which displacement or position must be measured over longer ranges. Such measurement is needed for producing a dimensional record or drawings of a "soft" or clay model of a vehicle body which has been sculptured for styling purposes. Over even longer ranges a vehicle such as a spacecraft or aircraft may utilize such measuring instruments for stabilization purposes.

There are, of course, several known systems for measuring the displacement of a body using radiant energy as the medium for making such measurements. These include interferometer and Doppler shift instruments but such prior art systems which afford a high degree of accuracy also require a high degree of stability in all parts of the system thus imposing considerable cost burden. Laser ranging systems are known in the art and are good for long distances but are not suitable for measuring distance or displacement at close range. Some prior art systems utilizing a highly directive beam of radiant energy require extremely accurate optical alignment such as can be obtained only with a cooperative reflective surface on the body undergoing measurement.

It is known in the prior art to employ systems which project radiation upon the surface of the body undergoing measurement and to measure the reflection as an indication of displacement. Such systems rely upon a change in the intensity or the relative size or shape of the reflected image in order to measure the distance to the body or to measure the amount of displacement. It is known in such systems to use a transmitter projecting a beam of radiant energy upon the surface of the body and a receiver with two channels for detecting the quantity of energy reflected from different parts of the surface. A particular problem in such systems is that nonuniformity or variations in the reflectance of the surface of the body being measured introduces substantial error into the measurement.

Accordingly, an object of this invention is to provide a displacement measuring system which provides measurements with an extremely high degree of accuracy using transmitted and reflected radiant energy without the introduction of error by reason of nonuniformity of reflectance of the surface of the body. Preferably, an optical system is employed with radiant energy having a wavelength in the infrared region. According to the invention, the field patterns of a pair of radiant energy transducers in the transmitting or receiving means are respectively incident upon the surface of the body in a common area with the field pattern of a transducer in the other. With the body being a reference position, the directivity of said transducers is such that the common areas coincide with each other so that the radiant energy emitted by the transmitter means and reflected from the common area of said body produces signals of equal value in the receiving means when the body is in its reference position. Accordingly, the signals may be combined differentially and will produce a null when the body is in its reference position irrespective of reflectance changes in the surface of the body. As the body moves toward or away from the reference position, the radiant energy reflected from the common areas on the body produces signals of different values in the receiving means and the difference thereof represents the magnitude and direction of the displacement of the body.

Another object of this invention is to provide a measuring system which is capable of making precise measurements of the displacement of the body from a reference position over either short or long range with substantially the same degree of accuracy. This is accomplished by use of a system wherein the receiver signals are differentially combined and a null signal is developed when the body is in its reference position with the received radiant energy reflected from the same area on the surface of the body. Furthermore, the transmitted and reflected radiant energy traverse substantially the same or closely adjacent paths between the measuring instrument and the body and consequently encounter the same variations in the transmission properties, for example, changes in atmospheric conditions. Because of the differential combination of the signals, such variations produce no net effect on the measurement.

A further object of the invention is to develop an output signal corresponding to the difference of a pair of signals without the need for separate combining means such as a differential amplifier. This is accomplished by energizing the system from a power supply with the supply voltage provided between a supply line and a point of common or reference potential which is distinct from the chassis ground potential; the chassis ground is "floated" on one of the signals and the other signal, referred to ground, becomes the output signal corresponding to the difference between the pair of signals. Preferably a symmetrical or double-ended power supply is used with a common terminal and a single-ended output is derived between the signal conductors with one of them grounded.

It is another object of the invention to provide a displacement measuring instrument of the type mentioned above wherein a high degree of sensitivity is achieved, i.e. an instrument which produces a large rate of change of signal amplitude as a function of displacement. This is accomplished in accordance with the invention by correlating the size or cross-sectional area of the transmitter and receiver field patterns with the directional angles thereof.

An additional object of this invention is to provide a system which automatically compensates the measurement for changes in the reflectance of the irradiated portion of the surface of the body undergoing measurement. In general, this is accomplished by developing a signal corresponding to the reflectance of the surface of the body and using it to maintain the measurement signals independent of reflectance. While a separate detector may be used to measure reflectance, it has been found that the summation of the receiver signals is of substantially constant value over the range of displacement measurement so long as the reflectance of the surface remains unchanged. Accordingly, in a preferred embodiment the summation of the signals is used directly to modulate the intensity of the transmitter beam so that the quantity of reflected radiant energy remains substantially constant irrespective of the variations in reflectance of the surface of the body.

These and other objects of the invention and the manner of their accomplishment will become more apparent from the description which follows taken with the accompanying drawings in which.

Figure 1:
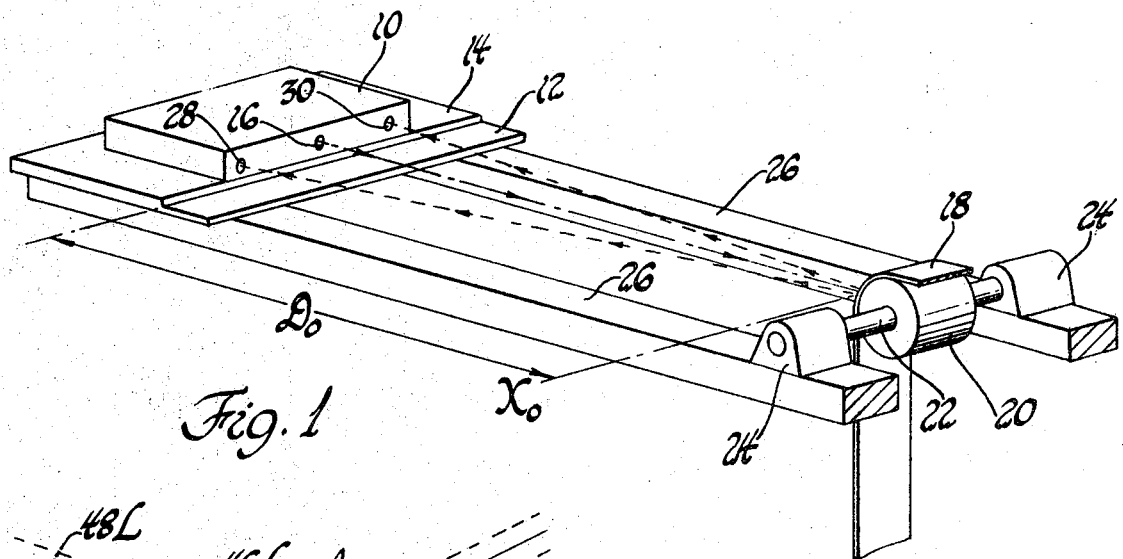
FIG. 1 is a diagrammatic illustration of the invention embodied in an instrument for measuring the dimensional variations in a workpiece.

Referring now to the drawings, FIG. 1 illustrates a typical application of the invention in a manufacturing operation, such as material processing, wherein dimensional measurement or control is provided. The displacement measuring instrument 10 is enclosed within a suitable cabinet or housing which in turn is mounted upon a fixed base plate 12. The base plate 12 suitably defines a datum position or line 14, as by a laterally extending surface, with reference to which the instrument 10 is positioned. The instrument 10 is suitably provided with a centrally located transmitter window 16 adapted to transmit radiant energy from the instrument 10 to the body or workpiece 18 in a suitable beam pattern. The workpiece 18 in the illustrated application is in the form of a relatively narrow strip of material such as metal the thickness of which is to be held within close tolerances. The strip, at the point of measurement, is passed over an idler roller 20 mounted upon a shaft 22 which is supported in journals 24. The support plate 12 for the instrument 10, and hence the datum line 14, is fixedly positioned with reference to the axis of the roller 20 by means of suitable beams 26 extending therefrom to the journal members 24. The instrument 10 is also provided with receiver windows 28 and 30 disposed on opposite sides of the transmitter window 16 and adapted to receive radiant energy reflected from the surface of the workpiece 18. In this arrangement it will be apparent that when the workpiece 18 has the desired or controlled thickness, its front surface will occupy what may be termed a reference position $X_0$ which will be a distance $D_0$ from the datum line 14. If the thickness of the workpiece 18 should increase, this dimensional change would be manifested in a displacement of the front surface toward the datum line 14. On the other hand, if the thickness of the workpiece 18 should decrease, the surface would withdraw from the datum line 14. The instrument 10, in accordance with this invention, is adapted to detect the most minute displacement of the surface of the workpiece with reference to the datum line and to produce an indication or a control signal which may be used with suitable control means to maintain the dimensional variation within extremely narrow limits.

In a preferred embodiment of the invention, the radiant energy employed as the medium for sensing displacement of the body is in the infrared region of the frequency spectrum. Operation of the instrument at this wavelength affords many advantages including the availability of relatively inexpensive, rugged and compact components for generating, controlling and detecting the radiant energy. It will be apparent, however, as the description proceeds that the invention may be practiced with the use of radiant energy at different wavelengths and with either coherent or noncoherent radiation.

Figure 2:
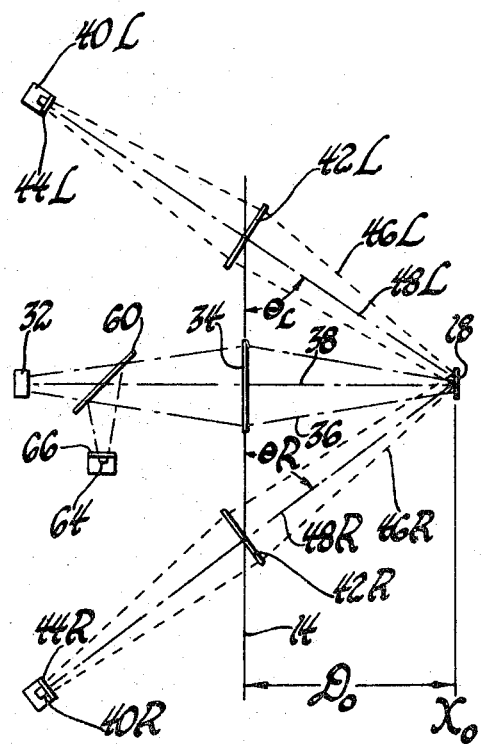
FIG. 2 is a diagrammatic representation of the optical system of a preferred embodiment of the invention.

Referring now to FIG. 2, there is illustrated the arrangement of the optical system of the instrument 10. The transmitter includes a radiant energy transducer in the form of a semiconductor emitting diode 32 disposed behind the optical window 16 within which is disposed a positive focusing lens 34. The emitting diode 32, when energized, emits radiant energy which passes through the lens 34 and is formed thereby into a transmitter beam 36 with a convergent field pattern having a circular cross section and a directional axis 38. The transmitter beam impinges upon the surface of the workpiece 18 at a distance $D_0$ from the datum line 14. The instrument also includes a receiver having a first or left channel provided with radiant energy transducers in the form of a photocell 40L, such as a semiconductor type photoconductive diode. The photocell is aligned with the optical window 30 in which is disposed a focusing lens 42L and a filter 44L is disposed between the lens and the photocell to exclude ambient light and other radiation outside the narrow band of wavelengths corresponding to the radiant energy transmitted by the emitting diode 32. The photocell 40L with its associated optical elements has a convergent field of view 46L with a field pattern which is circular in cross section and a directional axis 48L. The receiver includes a second or right channel which is the same as the left channel and includes a photocell 40R with a focusing lens 42R disposed in the optical window 28 with a filter 44R. The right channel has a field of view 46R with an axis 48R and a field pattern which is convergent and circular in cross section.

In order to provide compensation for nonuniformity in the reflectance of the surface of the body 18, provision is made as indicated in FIG. 2 to measure the reflectance of the surface. For this purpose a beam splitter 60, which suitably takes the form of a partially silvered mirror, is disposed at a 45° angle on the transmitter axis 38 within the instrument 10. With this arrangement, the radiant energy emitted from the emitting diode 32 passes through the beam splitter 60 with little attenuation, and the radiant energy reflected from the surface of the body 18 back along the axis 38 impinges upon the surface of the beam splitter 60 and is reflected thereby in a direction perpendicular to the axis 38. To measure the intensity of this reflected radiant energy, a photocell 64, provided with a suitable filter 66, is disposed in alignment therewith. The electronic system for energizing the emitting diode 32 and for developing and utilizing the signals from the photocells 40L, 40R and 64 will be explained in detail subsequently. Further consideration will now be given to the geometrical relationship of the transmitter beam, the receiver fields of view and the surface of the body undergoing measurement.

Figure 3:
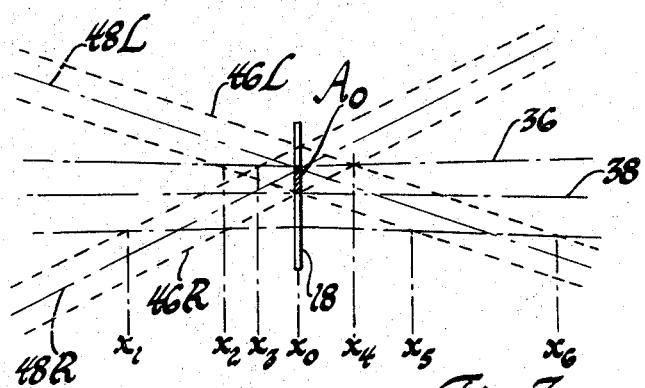
FIG. 3 is an enlarged view of a portion of the field pattern shown in FIG. 2.

Referring now to FIG. 3, there is illustrated an enlarged but fragmentary view of the field pattern of the transmitter beam 36 and receiver fields of view 46L and 46R in the vicinity of the surface of the workpiece 18. It is noted here that the axis 38 of the transmitter beam extends in a direction perpendicular to the datum line 14 and intercepts the surface of the workpiece 18 in a direction which is approximately normal thereto. The cross-sectional area of the field pattern of the transmitter beam 36 in the vicinity of the surface of the workpiece 18 is relatively small, for example having a diameter of about one-tenth of an inch and is, of course, smaller than the surface area of the workpiece. The field pattern of the receiver field of view 46L has its axis 48L inclined at an angle $\theta_L$ with reference to the datum line 14 and similarly the field pattern of the receiver field of view 46R has its axis 48R inclined at an angle $\theta_R$ ith reference to the datum line 14. The axes 48L and 48R intersect each other at the edge of the field pattern of the transmitter beam 36 in the plane of the surface of the workpiece 18 with it in its reference position. This relationship may be obtained by spacing the receiver windows 28 and 30 equidistantly from the transmitter windows in the instrument 10 with $\theta_L$ somewhat larger than $\theta_R$. The field patterns of the receiver fields of view 46L and 46R have substantially the same cross-sectional area and shape at the point where their axes intersect. It is further noted that the cross-sectional area of the fields of view are approximately the same as the cross-sectional area of the transmitter beam 36 in the vicinity of the reference position $X_0$. Consequently, the field of view of each channel of the receiver coincides in part with the transmitter beam 36 at the reference position and has a portion which falls outside the transmitter beam. At the reference position $X_0$ the field pattern of the field of view 46L and the field pattern of the transmitter beam are coincident in a common area $A_0$ (crosshatched in FIG. 3). Similarly, the field pattern of the field of view 46R and the field pattern of the transmitter beam are coincident upon the same common area $A_0$.

From examination of FIG. 3, it is apparent that with the workpiece 18 in its reference position, the photocell 40L sees only the diffuse reflection of the transmitted radiant energy from the common surface $A_0$ and produces a left channel signal SL which corresponds in amplitude to the irradiated area of the surface of the workpiece 18 which falls within its field of view. Similarly, the photocell 40R produces a right channel SR which has an amplitude corresponding to the irradiated area of the surface of the body 18 which falls within its field of view.

Figure 4:
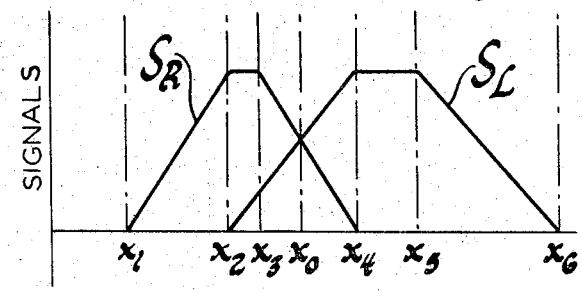
FIG. 4 is a graphical representation of the receiver signals resulting from displacement of the body from its reference position.

Referring now to FIG. 4, there is illustrated the graphical representation of the signals SL and SR as a function of displacement of the workpiece 18. The manner in which the signals vary with displacement is readily understood by reference to the construction lines of FIG. 4 extending in alignment with the construction lines of FIG. 3. Consider first the signal SR developed by the photocell 40R and the field of view 46R. For this purpose it will be assumed that the surface of the workpiece 18 is progressively moved from left to right. With the surface to the left of $X_1$ it is apparent that the field of view 46R does not intercept any portion of the surface which is irradiated by the transmitter beam and accordingly, the signal SR is zero. However, at the point $X_1$ the field of view intersects the transmitter beam 36 and the intercept area of the field of view with the transmitter beam on the surface continues to increase until the surface reaches the point $X_2$ where all of the field of view falls within the transmitter beam 36 and the signal becomes maximum. As the surface moves toward the reference position $X_0$, the amplitude of the signal remains constant until reaching point $X_3$ and then diminishes. When the surface reaches the point $X_4$, the field of view falls entirely outside the transmitter beam 36 and accordingly the signal SR becomes zero.

In a similar manner, the signal SL developed by the photocell 40L in the field of view 46L may be explained. Assume that the workpiece 18 is once again moved from left to right starting in a position to the left of point $X_2$ where all of the field of view falls outside the transmitter beam and accordingly the signal is zero. At the point $X_2$, the field of view 46L intersects the beam 36 and the intercept area increases with movement of the body to the right until point $X_4$ is reached at which substantially all of the field of view falls within the transmitter beam. At this point the signal reaches a maximum amplitude and remains substantially constant as the surface of the body 18 is moved to the right until reaching point $X_5$ at which the field of view 46L has a portion falling outside the transmitter beam 36. At this point the signal decreases until reaching the point $X_6$ at which all the field of view falls outside the transmitter beam and the signal becomes zero.

It is observed that with the workpiece 18 in its reference position, the signal SL and the signal SR are equal to each other because the respective fields of view each intercept the same common area $A_0$ with the transmitter beam on the surface. It is noted that maximum sensitivity, i.e. the maximum rate of change of signals with displacement is realized over the maximum range of displacement by having the axes of the receiver fields of view intersect at the reference position $X_0$ with the edge of the transmitter beam and with the edges of the fields of view intersecting the axis of the transmitter beam. With the fields of view having a sufficiently large cross section in the vicinity of the reference position $X_0$ so that the field falls partly inside and partly outside the transmitter beam pattern, both signals are caused to undergo a rapid rate of change in response to the first increment of motion in either direction from the reference position. By contrast, if the field of view of one of the receivers fell entirely within the transmitter beam at the reference position, displacement of the surface in one direction would produce no change in the intercept area except that which would result from convergence or divergence of the field of view which is a secondary effect in producing change in detector signal amplitude with displacement. The primary effect is produced by what might be termed the "edge effect," i.e. the increasing or decreasing intercept area of the field of view with the transmitter beam which results from the edge of the field of view cutting transversely across the edge of the transmitter beam.

Figure 5:
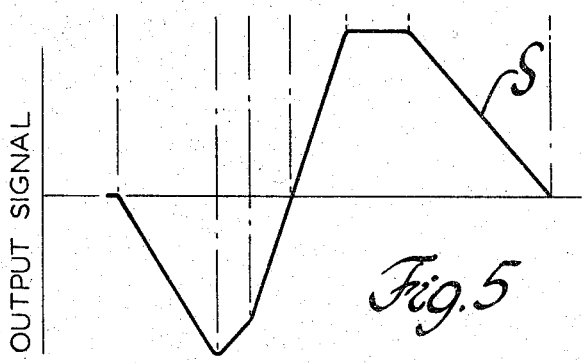
FIG. 5 is a graphical representation of the output signal derived from the differential combination of the signals illustrated in FIG. 4.

In FIG. 5 there is shown a graphical representation of the output signal S as a function of displacement. The output signal may be derived by differentially combining the left and right channel signals SL and SR as indicated by the construction lines extending from FIG. 5. In the illustrative embodiment, the signal SR is subtracted from the signal SL and the difference yields a signal which has zero or null value at the position $X_0$, a null value at the forward limit $X_1$ of the measurement range and at the far limit $X_6$ of the measurement range. Since the signal S reverses polarity or sign at the point corresponding to the reference position, the signal is indicative not only of the magnitude of displacement but also of the direction of displacement.

Figure 6:
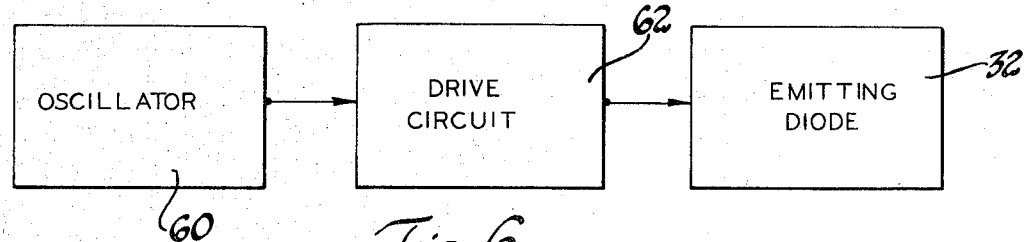
FIG. 6 is a block diagram of the transmitter.
Figure 7:
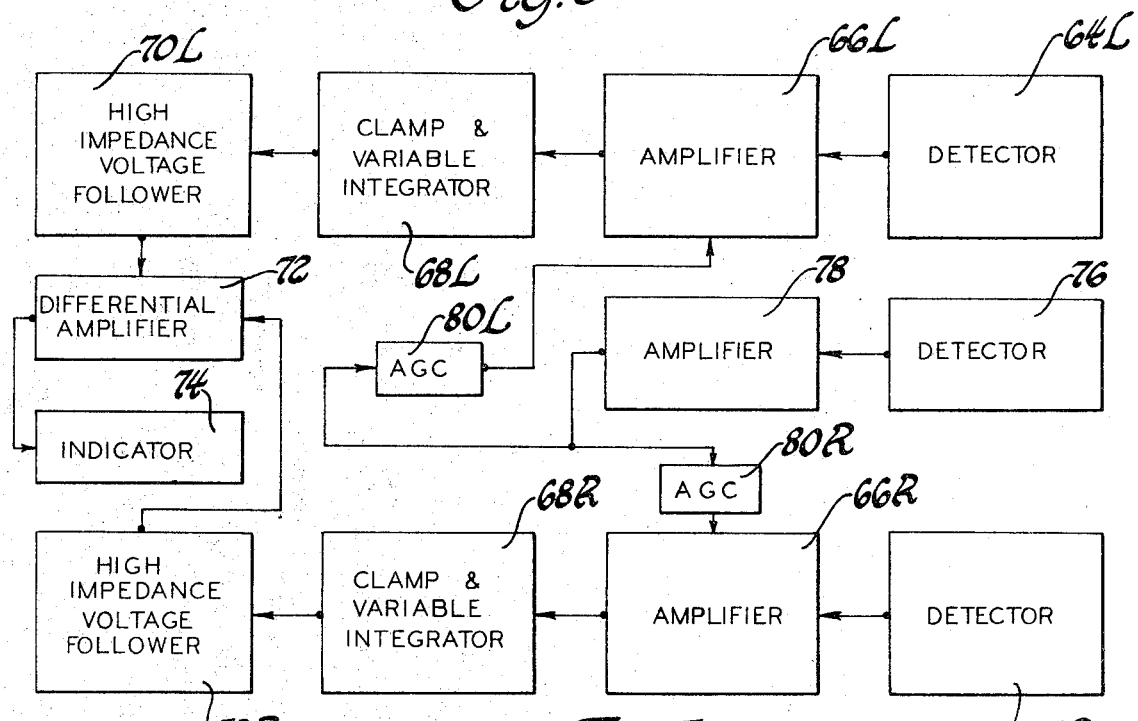
FIG. 7 is a block diagram of the receiver.

Referring now to FIGS. 6 and 7, the manner in which the system is implemented in order to produce the desired signals will be described. FIG. 6 is a block diagram of the electronic system of the transmitter. The transmitter comprises an oscillator 60 which controls the switching action of a drive circuit 62 which in turn energizes the emitting diode 32. In order that the radiant energy transmitted by the emitting diode may be readily distinguished from ambient and spurious radiation that might be incident upon the system, the radiation from the emitting diode is modulated at a relatively high frequency. For this reason, the oscillator 60, which may take the form of a conventional free running oscillator with the operating frequency of 100 kHz. is utilized as the modulator for controlling the drive circuit 62. The modulating frequency should be higher than the rate or frequency of movement of the workpiece. The drive circuit 62 is adapted to periodically apply voltage across the emitting diode at a frequency corresponding to the oscillator frequency. In this manner, the emitting diode 32 is caused to emit periodic impulses at a rate and of a duration controlled by the oscillator 60. The wavelength of the emission is determined by the characteristics of the emitting diode and, as previously stated, is suitably in the infrared range.

Referring now to FIG. 7, there is illustrated an electrical block diagram of the receiver system. Note that the receiver comprises a left channel and a right channel which are identical to each other. Referring now to the left channel, there is provided a detector 64L which includes the photocell 40L and which develops a detector signal corresponding to the quantity of radiant energy reflected from the surface of the body 18 in the field of view of the detector 64L. The detector signal is applied to the input of an amplifier 66L which is of narrow bandwidth having a center frequency corresponding to the modulation frequency of the transmitter. The amplifier 66L is provided with an adjustable gain control and develops an output signal corresponding to the detector signal which is applied to the input of a clamping and integrator circuit 68L. This circuit clamps the signal to a DC reference level and integrates the signal over a sufficient interval so as to reduce noise to a minimum for the desired frequency response. The output of the clamping and integrating circuit 68L is applied to the input of an amplifier 70L which is suitably a high impedance voltage follower. The amplifier 70L produces an output voltage which is applied to one input of a differential amplifier 72. In a similar manner the detector 64R develops a detector signal corresponding to the reflected radiant energy within the field of view of the detector. This detector signal is applied to the input of an amplifier 66R, the output of which is applied to the input of a clamping and integrating circuit 68R. The output of the circuit 68R is applied to the input of an amplifier 70R, the output of which is applied to the other input of the differential amplifier 72. The signals developed by the left and right channels are combined, as illustrated in FIG. 7, in a conventional manner using the differential amplifier 72. The differential amplifier is effective to combine the input signals and develop an output signal S corresponding in magnitude and polarity with the difference in magnitude of the input signals as represented in FIG. 5. This output signal is applied to a suitable indicator 74 which indicates the magnitude and polarity of the signal S and, hence, the displacement of the workpiece. For some applications a preferred arrangement for combining the signals from the left and right channels will be described subsequently with reference to FIG. 9 wherein the differential amplifier or other separate combining means is not required. In order to compensate for nonuniformity of reflectance of the surface of the workpiece 18, a detector 76 including the photocell 64 provides a detector signal corresponding to the radiant energy reflected back along the transmitter axis. This detector signal is amplified in the amplifier 78 and thence applied to the input of an automatic gain control circuit 80L, the output of which is applied to the gain control input of amplifier 66L. Similarly, the amplified detector signal is applied to the input of the automatic gain control circuit 80R, the output of which is applied to the gain control input of the amplifier 66R. In this manner the gain of amplifier 66L and the gain of amplifier 66R are adjusted so that the signals SL and SR respectively do not vary in accordance with the variations in reflectance of the surface of the workpiece 18.

Figure 8:
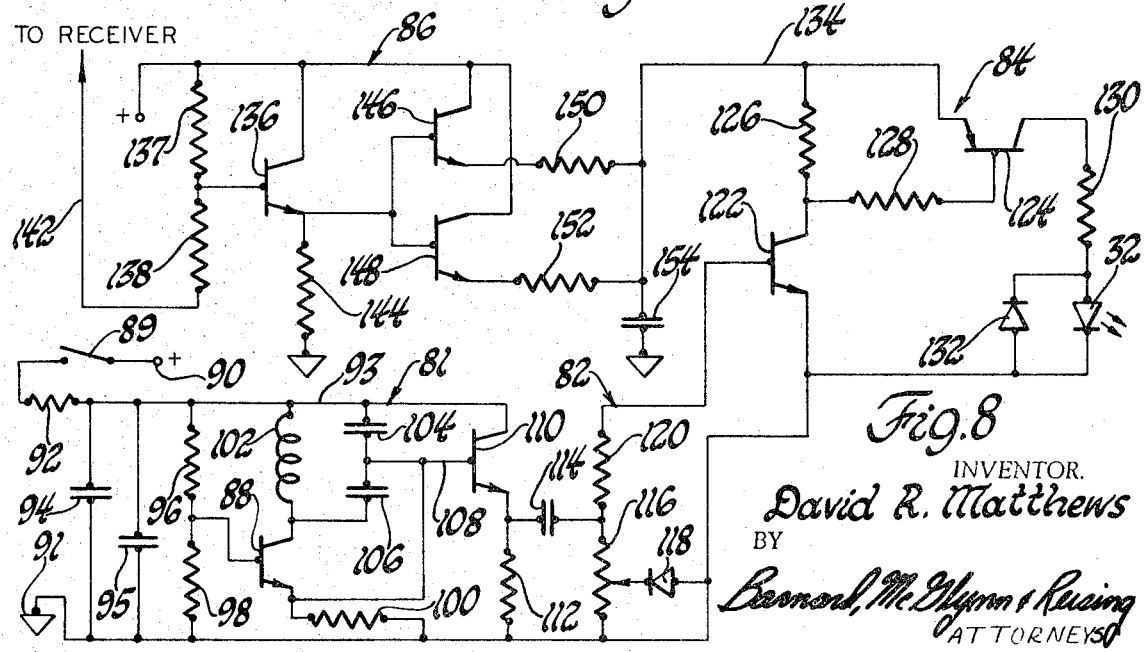
FIG. 8 is a schematic diagram of the transmitter.

Referring now to FIG. 8, there is shown a somewhat different embodiment of the invention insofar as the electronic circuitry is concerned, the circuits being illustrated in schematic diagram. FIG. 8 shows the transmitter which comprises an oscillator 81 which is utilized to develop a control signal and which has its output connected to the input of a squaring circuit 82 which in turn develops a switching voltage for a diode drive switch 84 to control the energization of the emitting diode 32. The transmitter also includes a regulated drive voltage for a diode drive switch 84 to control the energization of the emitting diode 32. The transmitter also includes a regulated drive voltage source 86 which determines the degree of energization of the emitting diode during each pulse interval. The circuit stages just referred to will now be considered in greater detail.

Figure 9:
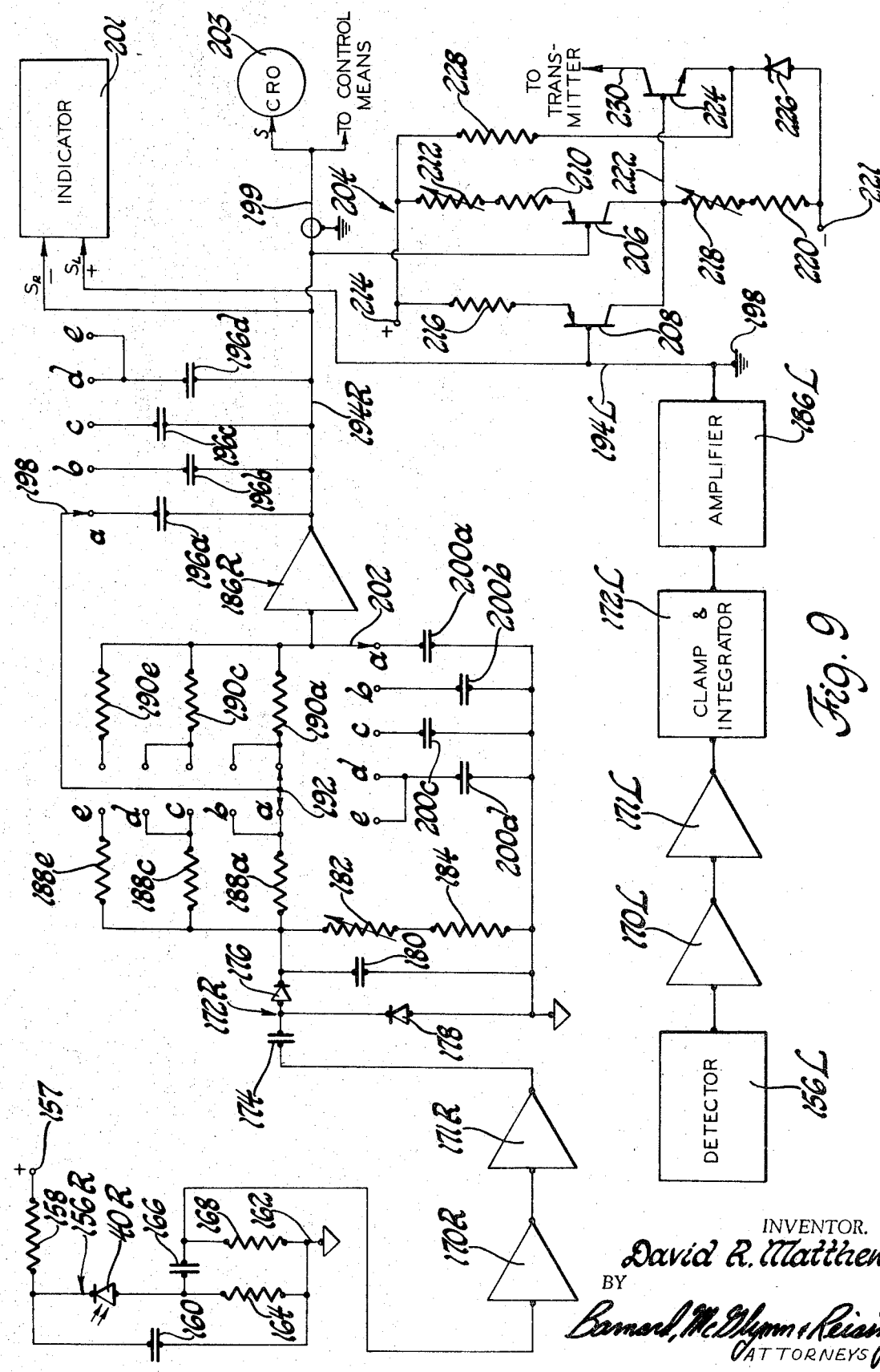
FIG. 9 is a schematic diagram of the receiver.

The transmitter circuits shown in FIG. 8 and the receiver circuits shown in FIG. 9 are energized from a direct current power supply, not shown. The power supply is of a conventional symmetrical or double-ended type with both positive and negative supply voltages are of a magnitude, with reference to the point of common or reference potential, suitable for the semiconductor devices in the circuits of the transmitter and receiver. The common terminal and hence the reference potential thereof is distinct from the chassis ground or ground reference potential of the system for reasons which appear subsequently.

Referring now to FIG. 8, the oscillator 81 suitably takes the form of a conventional Colpitts oscillator and includes a transistor 88. The oscillator is energized with supply voltage through a switch 89 from the positive supply terminal 90 and a common terminal 91. The positive terminal is connected through a resistor 92 to a voltage supply conductor 93 to which is connected a pair of filter capacitors 94 and 95. A pair of voltage divider resistors 96 and 98 are connected in series across the supply conductor and common with the junction thereof connected to the base electrode of transistor 88 to apply a forward bias voltage thereto. The emitter electrode of the transistor is connected through an emitter resistor 100 to common. A parallel resonant circuit including an inductor 102 and a pair of series capacitors 104 and 106 is connected between the collector electrode of the transistor 88 and the positive supply conductor. The output voltage of the oscillator is taken from the point between the capacitors 104 and 106 on conductor 108 and is applied as a feedback voltage in regenerative fashion to the emitter resistor 100. The output voltage of the oscillator on conductor 108 is also applied as the input signal to the squaring circuit 82. The oscillator 81 is adapted to produce a sine wave voltage output at a frequency of 100 KHz., for example.

The squaring circuit 82 comprises a transistor 110 having its base electrode connected with the output conductor 108 of the oscillator and having its emitter electrode connected through an emitter resistor 112 to common while the collector electrode is connected directly to the positive supply conductor. The emitter electrode of transistor 110 is also connected through a coupling capacitor 114 and thence through a potentiometer resistor 116 to common. A voltage limiting diode 118, suitably a zener diode, is connected from the movable contact on the potentiometer resistor 116 to common. The voltage developed at the junction of the capacitor 114 and the potentiometer resistor 116 is applied through a resistor 120 to the base electrode of the transistor 122 which has its emitter electrode connected directly to common and its collector electrode connected to the diode drive switch 84. The diode drive switch comprises a transistor 124 having resistors 126 and 128 connected across its emitter to base electrodes with the junction of said resistors connected directly to the collector electrode of transistor 122. The collector electrode of the transistor 124 is connected through a resistor 130 and thence through the emitting diode 32 to common. A protective diode 132 is connected in reverse polarity across the emitting diode to bypass any inverse voltages which may be developed thereacross. The emitter electrode of the transistor 124 is connected also through a conductor 134 to the regulated drive voltage source 86. This drive voltage source 86 comprises a current amplifier stage including a transistor 136 which has its base electrode connected to the junction point of a pair of voltage divider resistors 137 and 138 which in turn are connected across the positive terminal of the supply voltage source and a regulated reference voltage line 142 which, as indicated, is connected to the receiver and will be described subsequently. The collector electrode of the transistor 136 is connected directly to the positive terminal, and the emitter electrode is connected through an emitter resistor 144 to common. A pair of transistors 146 and 148 have their base electrodes connected directly together and to the junction of the emitter resistor 144 and the emitter electrode of the transistor 136. The collector electrodes of the transistors 146 and 148 are connected to the positive terminal of the supply voltage source, and the emitter electrodes are connected respectively through resistors 150 and 152 to one terminal of a storage capacitor 154 the other terminal of which is connected to common. The upper terminal of the capacitor 154 is connected through the conductor 134 to supply drive voltage to the emitting diode 32 through the drive switch 84.

In operation of the transmitter circuits just described, the transmitter is energized by closing the power switch 89 which provides supply voltage to the oscillator 81. The oscillator develops a sine wave output voltage which is supplied to the input of the squaring circuit 82. The transistor 110 conducts only on the positive swings of the transistor oscillator output voltage and accordingly, for each cycle of the oscillator a positive voltage impulse is developed across the emitter resistor 112. Through the coupling capacitor 114 a voltage of steep wave front is developed across the potentiometer resistor 116 and a zener diode 118 which at a predetermined voltage level becomes conductive and limits the voltage to a predetermined value. Thus, the voltage applied to the base electrode of the transistor 122 is substantially a rectangular pulse and causes the transistor 122 to be conductive. A square wave input voltage is developed across the resistor 126 which switches the transistor 124 to its fully conductive state thereby connecting the regulated voltage on the storage capacitor 154 across the emitting diode through the emitter to collector circuit of the diode drive switch transistor 124 and the series resistor 130. Thus, the transmitter will emit pulses of radiant energy which has a pulse repetition frequency corresponding to the frequency of the oscillator 81 with the pulse duration being approximately equal to the interval between pulses. The intensity of the pulses of radiant energy depends, of course, upon the value of drive current supplied to the emitting diode through the diode drive switch and this, in turn, depends upon the value of the voltage supplied from the storage capacitor 154 in the regulated voltage is determined will be described in detail with reference to the receiver circuitry.

Referring now to FIG. 9 there is shown in schematic diagram an embodiment of the receiver system of the invention. The receiver comprises right and left channels which are identical with each other and to avoid unnecessary repetition, the description will be given with reference to the right channel and while corresponding parts in the left channel are illustrated in block diagram. The detector 156R includes the photocell 40R which preferably takes the form of a photoconductive diode. The detector stage is energized from the power supply, not shown, with the positive terminal 157 connected through a resistor 158 and filter capacitor 160 to the common terminal 162. A load resistor 164 is connected in series with the photocell 40R across the capacitor 160. The voltage developed across the load resistor 164 is applied through a capacitor 166 across a resistor 168 and to the input terminal of a narrow bandwidth amplifier 170R. For a modulation frequency of 100 kHz. of the transmitter radiant energy, the bandwidth of the amplifier is centered at 100 kHz. and has a bandwidth of 12 kHz. The output of the amplifier 170R is applied to the input of an adjustable gain amplifier 171R and the output thereof is applied to the input of a clamping and integrating circuit 172R. This circuit includes a coupling capacitor 174, a series diode 176 and a shunt diode 178 connected from the junction of the capacitor 174 and diode 176 to common. An integrating capacitor 180 is connected from the cathode of the series diode 176 to common, and a variable resistor 182 and a fixed resistor 184 are connected in parallel with the capacitor 180. Thus, an integrated voltage clamped to the DC reference potential is developed across the resistors 182 and 184, and then applied to the input of an operational amplifier 186R, which includes provision for bandwidth selection and impedance change. The signal to the operational amplifier 186R is applied through input impedances which, in the condition illustrated, include resistors 188a and 190a which are connected together through selector switch contacts 192 and thence to the input terminal of the amplifier The output signal of the amplifier is developed on conductor 194 and a bandwidth determining feedback path is provided therefrom which includes, in the condition illustrated, a capacitor 196a connected through a selector switch contact 198 to the switch contact 192. The input terminal of the amplifier is connected through a selector switch contact 202 through a capacitor 200a to common. The selector switch contacts 192, 198 and 202 are suitably mechanically ganged for concurrent actuation from the position a to any of the remaining positions designated b, c, d and e. This enables the selection of input resistors 188a, 188c and 188e which are paired respectively with resistors 190a, 190c and 190e. Concurrently with this sequence, the feedback capacitors 196a, 196b, 196c and 196d are selected and at the same time capacitors 200a, 200b, 200c and 200d are selected in the amplifier input circuit. This band switching arrangement permits the selection of the amplifier bandwidth at five different values suitably 10 kHz., 1 kHz., 100 Hz, 10 Hz and 1 Hz in the order named. The output of the operational amplifier 186R corresponds to the right channel signal SR and is applied through the conductor 194R to one input of an indicator 201.

As previously mentioned, the left channel of the receiver is identical to the right channel just described and accordingly it is illustrated in block diagram. The left channel comprises a detector 156L, the output signal of which is applied to the bandwidth determining amplifier 170L and the adjustable gain amplifier 171L. The amplified signal is applied to the input of the clamping and integrating circuit 172L and the output signal thereof is applied through the operational amplifier 186L which develops an output signal on conductor 194L corresponding to the left channel signal SL and is applied to the other input of the indicator 201. Note that the input terminals of the indicator are designated plus and minus respectively to signify that the signals from the respective right and left channels are combined in the indicator in a differential manner. The indicator 201 may take any conventional form depending upon the specific application of the instrument and produces a readout corresponding to the signal S. It may comprise a microammeter of the null center type having a scale calibrated in units of displacement.

In some applications it is desirable to develop an electrical output signal S corresponding in amplitude and sign with the difference of the signals SL and SR and hence with the magnitude and direction of displacement of the workpiece. In order to combine the signals SL and SR differentially, without the need for separate combining means such as a differential amplifier, the output of amplifier 186L on conductor 194L is connected to ground 198. This has the effect of "floating" the power supply potentials on the signal SL and consequently the other signal SR taken with reference to ground is the same as the output signal S. Thus, a single-ended output signal is developed with reference to ground and may be applied directly to utilization means, such as the cathode ray oscilloscope 203, as indicated, through a shielded conductor 199 with the shield connected to ground. This arrangement is advantageous in that it eliminates the need for a differential amplifier or other separate combining means; especially in applications where the output is applied to control means or a strip chart recorder wherein the reference potential is ground and cannot be readily adjusted, as in a cathode ray oscilloscope.

The system includes means for developing a signal corresponding to the value of reflectance of the surface. As illustrated in FIG. 9, this comprises a summing amplifier 204 with a pair of transistors 206 and 208. The output signal of the operational amplifier 186R on the conductor 194R is applied to the base electrode of transistor 206 while the output signal of the operational amplifier 186L on conductor 194L is applied to the base electrode of transistor 208. The emitter of transistor 206 is connected through resistor 210 and variable resistor 212 to a positive terminal 214 of the supply voltage source and the emitter of transistor 208 is connected through the fixed resistor 216 to the same point. The collectors of the transistors are connected directly together and through a variable resistor 218 and a fixed resistor 220 to the negative terminal 221 of the power supply. The voltage developed at the upper terminal of the variable resistor 218 corresponds to the summation of the output signals, SL and SR, of the left and right channels of the receiver. This voltage is applied through a conductor 222 to the base electrode of a transistor 224 which has its emitter electrode connected to the negative supply voltage through a reference voltage device, zener diode from 226. The positive supply voltage is connected from terminal 214 through a resistor 228 to the cathode of the zener diode 226 and thus maintains the diode in a conductive condition whereby the emitter of transistor 224 is maintained at a constant voltage level. The collector electrode of the transistor 224 is connected through a conductor 230 to the conductor 142 in the transmitter. Consequently, the collector current of the transistor 224 depends upon the value of the voltage applied to the base electrode which in turn corresponds to the summation of the left and right channel signals of the receiver. The value of the collector current, in turn, determines the input voltage to the current amplifier 86 in the transmitter which controls the drive current for the emitting diode 32 as previously explained.

It is to be noted that the sum of the left and right channel signals of the receiver is of substantially constant value over the linear range of measurement. This relationship may be noted by inspection of FIG. 4 wherein it is seen that the portion of the left channel signal SL extending from $X_2$ to $X_4$ and the portion of the right channel signal SR extending from $X_3$ to $X_4$ are substantially straight lines having substantially inverse slope values with a crossover point at the reference position $X_0$. Accordingly, over this range, which may correspond to the range of measurement, the summation of these signals is substantially constant. It is observed that the sum of the left and right channel signals will more nearly approach a constant value as the direction angles $\theta_L$ and $\theta R$ approach equal values and as the transmitter beam and the fields of view approach parallel or collimated field patterns, as opposed to converging or diverging patterns. To make the direction angles equal, the left and right receiver channels may be spaced unequally from the transmitter. It will be appreciated that the left and right channel signals may be shaped to a considerable extent by variations in the geometry of the optical systems.

In operation of the reflectance compensating circuit, it is to be noted that the summation of the right and left channel signals developed in the summing amplifier 204 is a given constant value, as displacement varies, so long as the reflectance of the surface of the body does not change. If the reflectance changes then the sum of the signals assumes a different value which remains constant as the displacement varies. Thus, the summation signal developed at the base electrode of transistor 224 is maintained at a predetermined value when the reflectance of the surface of the workpiece is of a predetermined value. This maintains the collector current of the transistor 224 at such a value that the current amplifier 86 and the diode drive switch 84 provide the right amount of drive current to the emitting diode 32 so that the summation of the left and right channel output signals of the workpiece receiver remains constant. It is noted that the signals for the compensating circuit are taken after the bandwidth selection provided in amplifiers 186L and 186R and thus, the rate of the control signal, as determined by its frequency components, is established by the band switching. If the reflectance of the workpiece should increase to a value higher than the predetermined value, then the summation of the signals at the base electrode of transistor 224 would increase and the collector current thereof would increase whereby the base drive of the transistor 136 in the current amplifier stage 86 decreases and the voltage applied through the diode drive switch 84 to the emitting diode 32 decreases. Consequently, the intensity of the emitted radiant energy pulses decreases and the summation voltage of the left and right channel output voltages is decreased toward its predetermined value. Similarly, if the reflectance of the surface of the workpiece should decrease, the summation signal would likewise decrease and the collector current of transistor 224 would decrease which would increase the base drive of transistor 136 in the current amplifier 86. This would increase the voltage applied through the diode drive switch 84 to the emitting diode and consequently increase the intensity of the emitted radiant energy pulses. This would increase the value of the summation voltage toward its predetermined value. It can readily be seen that the net effect of the reflectance compensating circuits is to adjust the energization of the emitting diode in such a manner that the summation of the left and right channel signals remains constant. As a result, the accuracy of measurement is unaffected by the nonuniformity of reflectance of the surface of the workpiece.

In operation of the overall system just described, the instrument is first appropriately aligned with respect to the workpiece. The transmitter is aligned so that the beam of radiant energy emitted therefrom impinges upon the desired portion of the workpiece 18. In this position the fields of view 46L and 46R intercept the surface of the workpiece in such a manner that the respective axes thereof intersect each other and the edge of the transmitter beam 36 at a point which establishes the reference position for the workpiece surface. To initiate operation, the transmitter is energized by closing the power switch 89 thereby energizing the oscillator 81. The output of the oscillator is supplied through the squaring circuit 82 to the diode drive switch 84 which energizes the emitting diode 32 at a pulse repetition frequency corresponding to the frequency of the oscillator. With the transmitter and receiver aligned as previously described and with the workpiece in its reference position, the photocells 40L and 40R receive equal amounts of reflected radiant energy from the surface of the workpiece. Accordingly, the detectors 156L and 156R will develop equal signals. The signal from the detector 156R is applied through the fixed bandwidth amplifier 170R and the adjustable gain amplifier 171R to the clamping and integrating circuit 172R and thence to the input of the operational amplifier 186R. The bandwidth selector switch of the operational amplifier is set in accordance with the frequency characteristics of the displacement of the workpiece and the desired utilization of the output signal. The output signal from the operational amplifier is applied to the one input of the summing amplifier 204 and is also applied to one input of the indicator 201. Similarly, the signal from the detector 156L is applied to the fixed bandwidth determining amplifier 170L and the adjustable gain amplifier 171L and thence to the input of the clamping and integrating circuit 172L. The clamped and integrated signal is applied to the input of the operational amplifier 186L, the output of which is applied to one input of the summing amplifier 204 and is also applied to the other input of the indicator 201. As previously described, the summing amplifier is effective in conjunction with the current amplifier 86 at the transmitter to adjust the energizing voltage for the emitting diode so that the sum of the output signals from the left and right channels remain constant even though the reflectance of the surface of the workpiece may vary. With the surface of the workpiece in the reference position as just described, the indicator 201 will receive signals of equal value on its input terminals and will produce a null or zero displacement indication. When the workpiece is displaced toward the datum line 14, the field of view 46R of the right channel will coincide with a greater portion of the transmitter beam 36 on the surface of the workpiece and, consequently, the right channel signal will increase in value. At the same time, the field of view 46L of the left channel will intercept a smaller portion of the transmitter beam 36 on the surface and the left channel signal will diminish in value. This may be readily observed by an inspection of FIGS. 3 and 4. Consequently, the output signal of the right channel operational amplifier 186R will predominate over the value of the output signal of the operational amplifier 186L. Accordingly, a displacement or output signal S is developed as indicated in FIG. 5 and which is of such polarity or sign as to indicate displacement toward the datum line 14 with the magnitude thereof being directly proportional to the amount of displacement from the reference position. Similarly, when the workpiece is displaced in the other direction, i.e. away from the datum line 14 past the reference position, the left channel signal will increase and the right channel signal will decrease whereby a different signal will be developed as indicated in FIG. 5 having a magnitude and polarity corresponding respectively to the amount and direction of the displacement from the reference position. This is indicated directly on the indicator 201, suitably a meter of the null center type.

Figure 10:
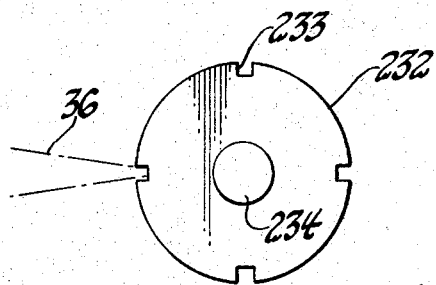
FIG. 10 illustrates a test body upon which measurements were made with an embodiment of this invention.

Referring now to FIG. 10, there is shown a sample workpiece in the form of a cylinder 232 which is provided with four equally spaced slots 233. The cylinder 232 is suitably mounted on a shaft 234 which is adapted to be rotated at a desired speed by a motor not shown. In the sample piece on which certain data was taken with the instrument of this invention, the cylinder was 2 inches in diameter and the slots were 0.125 inches wide and 0.125 inches deep. As indicated, the transmitter beam 36 was caused to impinge upon the circumference of cylinder 232. In the manner such as that illustrated in FIG. 9, the output signals of the left and right channels were applied to the input of a cathode ray oscilloscope 203.

Figure 11:
FIGS. 11, 12 and 13 are graphical records of signals representing the measurements taken on the body of FIG. 10.

FIG. 11 illustrates the waveform developed on the cathode ray oscilloscope with the cylinder rotating at a speed of 970 revolutions per minute. The waveform was plotted to a scale of 5 milliseconds per division on the x-axis and 1 volt per division on the y-axis. Note that the voltage level 235 represents the circumference of the cylinder, and the waveform spikes 236 represent the radial displacement of the surface to the bottom of the slots.

Figure 12:
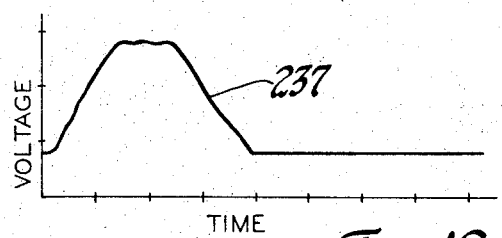

In FIG. 12 the data was taken with the cylinder rotated at a speed of 480 revolutions per minute. The waveform was plotted to a scale of 0.5 milliseconds per division on the x-axis and 1 volt per division on the y-axis. The change of voltage by the impulse 237 represents the displacement from the periphery to the bottom of the slot.

Figure 13:
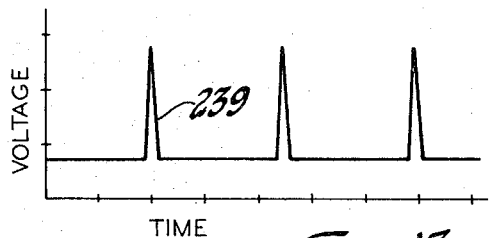

The data represented in FIG. 13 was taken with a cylinder 232 rotating at a speed of about 6,000 revolutions per minute. In this case the waveforms were plotted to a scale of 1 millisecond per division on the x-axis and 1 volt per division on the y-axis. The waveform spikes 239 represent the depth of the slots.

Figure 14:
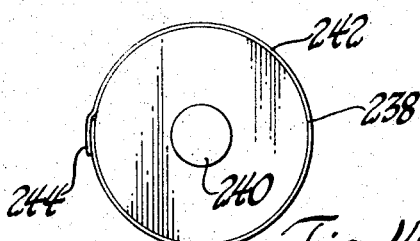
FIG. 14 is another test body upon which dimensional measurements were taken with an embodiment of this invention.
Figure 15:
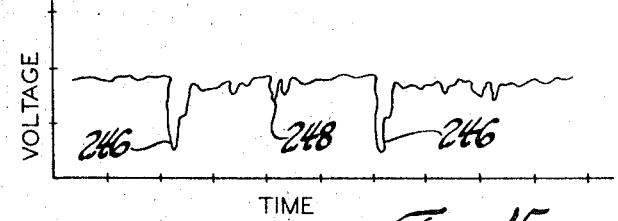
FIG. 15 is a graphical record of the measurement signal corresponding to dimensional variation of FIG. 14.

FIG. 14 there is illustrated another sample workpiece in the form of a cylinder 238 mounted for rotation upon a shaft 240 by a motor not shown and having a thin tape 242 affixed to the circumference thereof and having an overlap 244. In this sample workpiece, the cylinder was 2 inches in diameter and the tape has a thickness of 0.007 inches. The transmitter beam of the measuring instrument is caused to impinge upon the circumference of the workpiece and the workpiece is rotated at approximately 3,000 r.p.m. The waveforms were recorded at a scale of 5 milliseconds per division on the x-axis and 0.5 volts per division on the y-axis The waveform spikes 246 represent the overlap 244 of the tape and hence correspond to a dimensional change of about 0.007 inches. The smaller waveform spikes 248 represent surface irregularities or displacements caused by the tape pulling away from the surface of the cylinder at the high rotational speeds.

Figure 16:
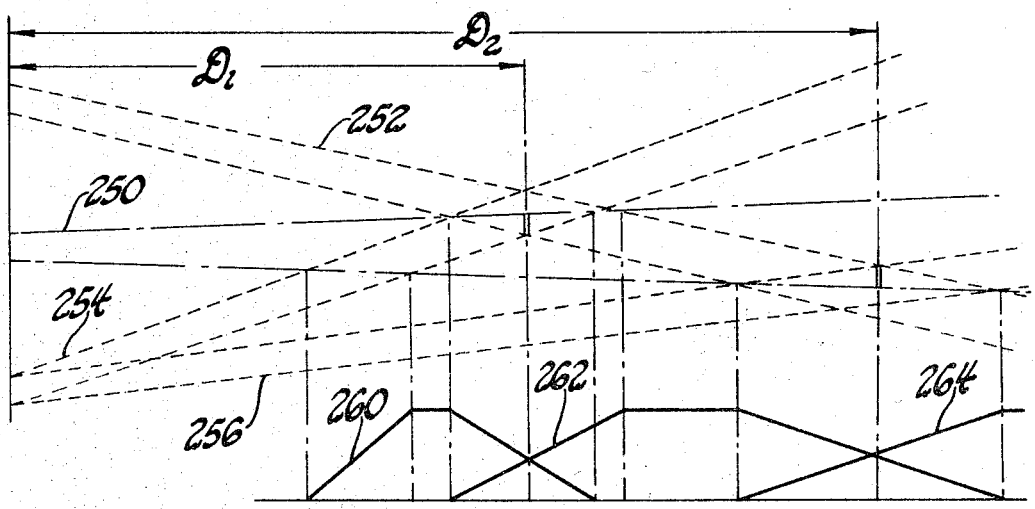
FIG. 16 shows the optical geometry of another embodiment of the invention in which an additional reciever is employed and shows a graphical representation of the signals derived from the instrument.

Referring now to FIG. 16, there is shown a modified embodiment of the invention. The embodiment illustrated in FIG. 16 is different from the embodiment illustrated in FIG. 2 and 3 in that the optical systems are designed to produce a divergent transmitter beam 250 and divergent fields of view 252 and 254 for the left and right channels of the receiver. Additionally, the receiver is provided with a third channel having an optical system and associated electronic circuits as illustrated in FIGS. 2 and 9 with a field of view 256. An additional optical window may be located directly under window 28 to accommodate the third channel. With this arrangement the field of view 252 and the field of view 254 have their axis crossing at the edge of the transmitter beam 250 thereby defining a first reference position at a distance $D_1$ from the datum line 14. The field of view 252 and the field of view 256 also have their axes intersecting at the edge of the transmitter beam 250 thereby defining a second reference position at a distance $D_2$ from the datum line 14.

Each of the receiver channels will develop a different channel signal as indicated by inspection of FIG. 16. It is noted that the right channel field of view 254 will produce a signal 260 while a field of view of the left channel will produce a signal 262 which is of the same value as signal 260 at the first reference position. The right channel field of view 256 will produce a signal 264 which is equal in value to the signal 262 at the second reference position. The signals corresponding to the paired channels of the receiver may be combined in a manner similar to that described with reference to FIG. 8 to produce a displacement signal indicative of the displacement of the body from the corresponding reference position. In this manner the system may be employed with both near and far limit reference positions and thus provide a grater range of displacement measurement in a single instrument.

Although this invention has been described with reference to particular embodiments thereof, it is no sense limited thereto. Many variations and modifications of the invention will now occur to those skilled in the art. The scope of the invention is defined in the appended claims.

I claim:

1. An instrument for measuring the translational displacement of a body from a reference position, the instrument comprising, transmitting and receiving means, one of said means including a first radiant energy transducer having a directional axis and a predetermined field pattern, the other of said means including second and third radiant energy transducers each of which has a directional axis and a predetermined field pattern with the axes intersecting each other laterally of the directional axis of the first transducer at said reference position, the field pattern of said first transducer and the field pattern of said second transducer being incident upon the surface of said body in a common area and the field pattern of said first transducer and the field pattern of the third transducer being incident upon the surface of the body in a second common area, said first and second common areas being coincident when the body is in said reference position, each transducer in the transmitting means being adapted to emit radiant energy in its respective field pattern and each transducer in the receiving means being adapted to produce and electrical signal in response to reception of radiant energy in its respective field pattern, whereby the radiant energy emitted by the transmitting means and reflected from said common area on said body produces first and second signals of equal value in the receiving means when said body is in its reference position and produces first and second signals of different value when said body is translationally displaced from said reference position.

2. The instrument defined in claim 1 wherein the second and third radiant energy transducers are located on opposite sides of the first radiant energy transducer and wherein the cross-sectional area of the field patterns of the second and third radiant energy transducer is approximately equal, in the vicinity of said reference position, to the cross-sectional area of the field pattern of the first radiant energy transducer, a portion of the field pattern of the second and third transducers falling outside the field pattern of the first transducer when the body is in its reference position.

3. The instrument defined in claim 1 wherein the second and third radiant energy transducers are disposed on opposite sides of the first radiant energy transducer and wherein the directional axes of said second and third radiant energy transducers intersect each other at one edge of the field pattern of the first radiant energy transducer, said intersection being at said reference position.

4. The instrument defined in claim 1 further comprising means for combining said first and second signals in a differential manner whereby the difference thereof represents the magnitude and direction of displacement of said body from said reference position, and means for producing a signal corresponding to the reflectance of the surface of said body and means for applying said third signal to one of said transmitting and receiving means to maintain said third signal at a substantially constant value.

5. An instrument for measuring the translational displacement of a body from a reference position, the instrument comprising, a transmitter including a source of radiant energy and being adapted to project a transmitter beam of radiant energy along a directional axis to irradiate at least a portion of said body in a predetermined pattern, a receiver including first and second detector means responsive to said radiant energy to produce a signal corresponding to the quantity of radiant energy impinging thereon, each of said detector means having a field of view extending along a directional axis in a predetermined pattern, said fields of view being convergent toward said reference position and having substantially the same predetermined patterns, a part of said predetermined patterns of the fields of view falling outside of the transmitter beam pattern in the vicinity of said reference position and a part of said fields of view and said transmitter beams coinciding in a common area on the surface of said body in said reference position, whereby said detector means receive equal quantities of reflected energy from said common area and produce signals of equal value when said body is in said reference position and produce signals of different value when said body is translationally displaced toward or away from said reference position.

6. The instrument defined in claim 5 wherein the first and second detector means are disposed on opposite sides of said transmitter and the directional axes of said fields of view of the detector means intersect each other and one edge of the transmitter beam in the vicinity of said reference position.

7. The instrument defined in claim 6 wherein the cross-sectional areas of the predetermined pattern of said fields of view are approximately equal to the cross-sectional area of the transmitter beam in the vicinity of said reference position whereby the fields of view fall partly inside and partly outside of said transmitter beam at said reference position.

8. The instrument defined in claim 7 further comprising means connected with said first and second means for combining said signals in a differential manner whereby the combination of said signals has a magnitude and sign corresponding to the magnitude and direction of displacement of said body from the reference position.

9. The instrument as defined in claim 5 further comprising means connected with said transmitter for modulating said beam of radiant energy at a frequency substantially higher than the frequency of movement of said body, said receiver including first and second bandwidth determining means connected respectively with said first and second means and having a center frequency equal to the modulating frequency of said transmitter and having a relatively narrow bandwidth to exclude unwanted frequencies, and means connected with both of said detector means for subtracing one of said signals from the other whereby the difference of said signals has a magnitude and sign corresponding to the magnitude and direction of displacement of said body from said reference position.

10. The instrument defined in claim 9 additionally comprising means for developing a third signal corresponding to the reflectance of the surface of said body and means for applying said third signal to said transmitter to control the intensity of said beam of radiant energy so that said third signal remains substantially constant.

11. The instrument defined in claim 5 additionally comprising a third detector means responsive to said radiant energy to produce a signal corresponding to the quantity of radiant energy impinging thereon and having a field of view extending along a directional axis in a predetermined pattern, the fields of view of the third detector means and the first and second detector means having substantially the same predetermined patterns, said predetermined patterns of the fields of view of the first and third detector means and of the transmitter beam coinciding in a second common area on the surface of said body when the body is in a second reference position, whereby the first and third detector means receive equal quantities of reflected energy from said second common area and produce signals of equal value when said body is in the second reference position and produce signals of different value when said body is displaced toward or away from the second reference position.

12. An instrument for measuring the displacement of a body with reference to a datum position, the instrument comprising, a transmitter including a source or radiant energy and being adapted to project a transmitter beam of radiant energy along a directional axis to irradiate at least a portion of said body in a predetermined pattern, a receiver including first and second detector means each being responsive to said radiant energy to produce a signal corresponding to the quantity of radiant energy impinging thereon, each of said detector means having a field of view extending along a directional axis in a predetermined pattern, the axes of said fields of view intersecting each other at a point displaced from said datum position, the field of view of one of said detector means and the beam of said transmitter being incident upon the surface of said body in a first common area and the field of view of the other detector means and the beam of said transmitter being incident upon the surface of the body in a second common area, said first and second common areas being coincident when the body is in a reference position, whereby said detector means receive equal quantities of reflected radiant energy from said common area and produce signals of equal value when said body is in the reference position, the patterns of said fields of view being substantially coincident with each other and falling partly inside and partly outside the pattern of the transmitter beam on said body in its reference position, whereby one of the detector means produces an increasing signal with displacement of the body from the datum position and a decreasing signal with displacement away from the datum position and the other detector means produces an increasing signal with displacement of the body with the reference position away from the datum position and a decreasing signal with displacement toward the datum position, and means effectively connecting the detector signals in opposition so as to produce an output signal corresponding in magnitude and sign to the difference in magnitude of said signals, whereby the output signal is indicative of the magnitude and direction of said displacement.

13. The instrument defined in claim 12 wherein the first and second detector means have their fields of view disposed on opposite sides of the transmitter beam and the directional axes thereof intersect each other and one edge of the transmitter beam in the vicinity of the reference position.

14. The instrument defined in claim 12 including means for developing a signal corresponding to the reflectance of the surface of the body, and means applying the last-mentioned signal to said transmitter to modify the intensity of the transmitter beam so that the values of the signals from the detector means are unaffected by variations in the reflectance of the surface of the body.

15. The instrument defined in claim 72 including combining means connected with the detector means and being adapted to produce a control signal corresponding to the sum of the signals from the detector means and thereby being indicative of the value of reflectance of the surface of said body, and means applying said control signal to the transmitter to modify the intensity of the transmitter beam so the control signal is maintained substantially constant and said output signal is unaffected by variations in the reflectance of the body.

16. An instrument for measuring translational displacement of a body over a range of displacements extending in opposite directions from a reference position, said instrument comprising, transmitter means for projecting a beam of radiant energy onto said body in a direction which is substantially normal to the surface of the body, receiver means having first and second channels with spaced apart fields of view and directional axes located on opposite sides of the transmitter beam and being inclined toward the transmitter beam, said receiver fields of view being partly inside and partly outside the transmitter beam in the vicinity of said reference position so that the first and second channels receive equal amounts of radiant energy reflected from a common area on the surface of said body when the body is in said reference position and the first and second channels receive respectively increasing and decreasing amounts of reflected radiant energy when the body is displaced in one direction from the reference position and receive respectively decreasing and increasing amounts of reflected radiant energy when the body is displaced in the other direction from the reference position, the first and second channels each including electronic means for developing a signal corresponding to the amount of radiant energy within the respective fields of view, and utilization means connected with the electronic means.

17. An instrument for measuring displacement of a body over a range of displacements extending in opposite directions from a reference position, said instrument comprising, transmitter means for projecting a beam of radiant energy onto said body, receiver means having first and second channels each having a field of view directed toward said body, said transmitter beam and receiver fields of view being directed so that the first and second channels receive equal quantities of reflected radiant energy when the body is in said reference position, and the first and second channels received, respectively, increasing and decreasing quantities of reflected radiant energy when the body is displaced in one direction from the reference position and receive, respectively, decreasing and increasing quantities of reflected radiant energy when the body is displaced in the other direction from the reference position, said quantities of reflected radiant energy varying as a substantially linear function of displacement over said range of displacements, the first and second channels each including electronic means for developing a signal corresponding to the quantity of reflected radiant energy within the respective fields of view, means effectively connecting said signals in a differential manner to produce an output signal which varies in magnitude and sign with the magnitude and direction of said displacement, combining means connected with both of said electronic means for combining said signals in an additive manner to produce a control signal which remains substantially constant as the displacement of said body varies over said range and which varies directly with changes in reflectance of the surface of said body.

18. The instrument defined in claim 17 further comprising, means connecting said combining means with said transmitter means and applying said control signal thereto for modifying the intensity of said transmitter beam so that the control signal remains substantially constant with variations in the reflectance of the surface of said body.

19. A displacement measuring instrument comprising a transmitter adapted to direct radiant energy in a transmitter beam having a predetermined field pattern with a directional axis adapted to be directed toward a workpiece, a receiver with first and second channels each including radiant energy responsive transducers adapted to produce a signal corresponding to the quantity of radiant energy impinging thereon, means in each channel adapted to provide a field of view having a predetermined field pattern with a directional axis adapted to be directed toward said workpiece to receive radiant energy reflected therefrom, power supply means with a supply voltage referred to a common reference potential distinct from the ground potential, amplifier means in each channel having an input connected to said detector circuit and adapted to develop first and second signals respectively between respective signal conductors and a point of common reference potential, the first signal conductor being connected to a point of ground potential whereby the voltage on the second signal conductor, with reference to ground potential, corresponds to the difference in magnitude of the first and second signals.

20. The instrument defined in claim 19 wherein the power supply means provides positive and negative supply voltages referred to the common reference potential, a summing circuit energized by the positive and negative supply voltages and having input connected respectively with the first and second signals to develop a control signal referred to said negative supply voltage, and voltage regulating means responsive to said control signal and connected with the transmitter to control the intensity of the transmitter beam.

21. A displacement measuring instrument comprising a transmitter including voltage supply means, an emitting diode adapted when energized to emit radiant energy in a narrow band of wavelengths, on oscillator connected with the voltage supply means and adapted to produce an output voltage at a desired modulation frequency, modulating means connected between said oscillator and said emitting diode and adapted to energize said emitting diode from the voltage supply means at said modulation frequency whereby said emitting diode emits a continuous wave of pulses of radiant energy, optical means coupled with said emitting diode and adapted to direct said pulses of radiant energy in a transmitter beam having a predetermined field pattern with a directional axis adapted to be directed toward a workpiece, a receiver including voltage supply means, first and second channels each including a photocell in a detector circuit adapted to develop a signal corresponding to the quantity of radiant energy impinging thereon and falling within said narrow band of wavelengths, optical means in each channel with the photocell adapted to provide a field of view having a predetermined field pattern with a directional axis adapted to be directed toward said workpiece to receive radiant energy reflected therefrom, amplifier means in each channel having an input connected to said detector circuit and adapted to develop first and second signals respectively, means effectively connecting said first and second signals in a differential manner to develop an output signal corresponding to displacement, combining means connected with the amplifier means of both of said channels and adapted to combine said first and second signals in an additive manner to develop a control signal, and voltage regulating means connected between the voltage supply means and the modulating means, the voltage regulating means also being connected with the combining means and being adapted to develop an energizing voltage for the emitting diode in accordance with the variations in said control voltage.

22. The instrument defined in claim 21 wherein said amplifier means includes a first amplifier having a narrow bandwidth centered at said modulation frequency, a clamping and integrating circuit connected with the output of the first amplifier, and a second amplifier including band-pass switching means connected with the output of the clamping and integrating circuit whereby the amplifier means develops said first and second signals having frequency components within a selected bandwidth.